UNITED STATES PATENT OFFICE.

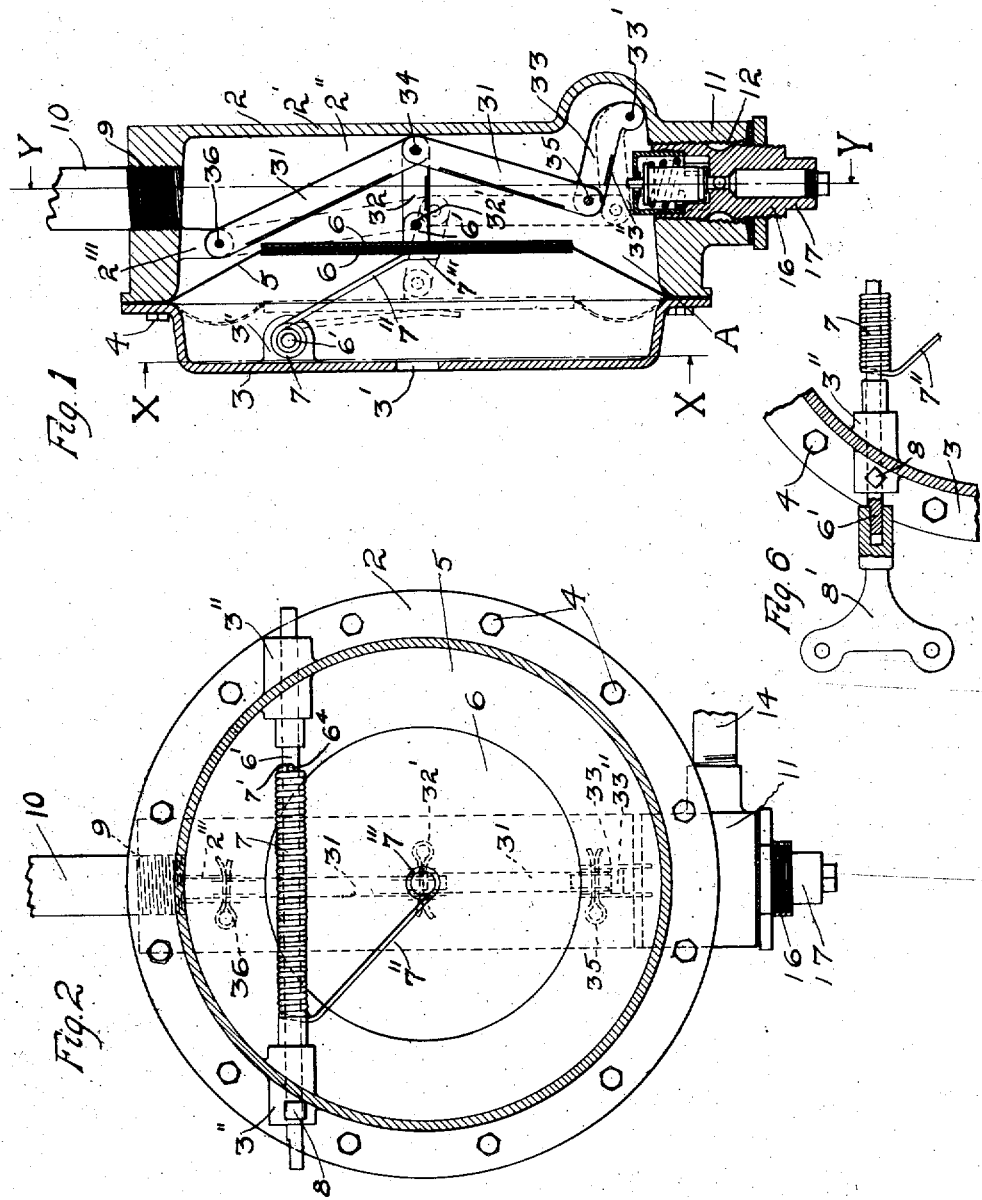

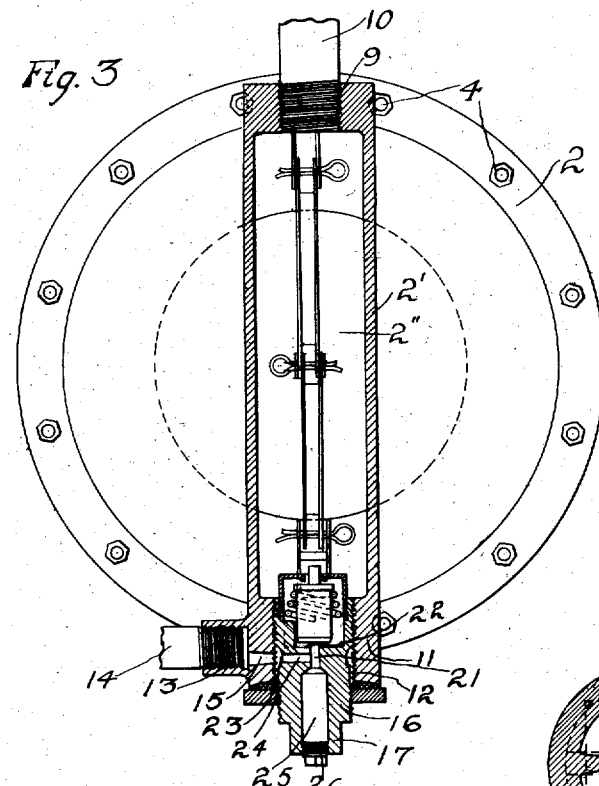
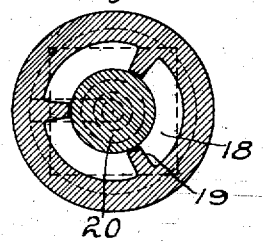
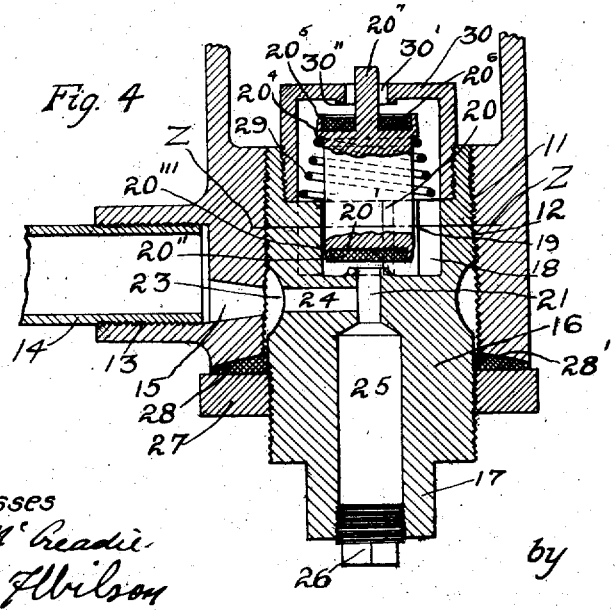
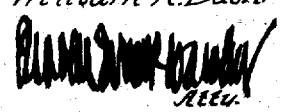

WILLIAM A. BAEHR, OF CHICAGO, ILLINOIS, ASSIGNOR TO THE RELIANCE ENGINEERING & MANUFACTURING COMPANY OF CHICAGO, OF CHICAGO, ILLINOIS, A CORPORATION OF WEST VIRGINIA.

AUTOMATIC GAS-REGULATOR.

986,344.     Specification of Letters Patent.     Patented Mar. 7, 1911.

Application filed July 14, 1910. Serial No. 572,049.

*To all whom it may concern:*

Be it known that I, WILLIAM A. BAEHR, a citizen of the United States, and resident of Chicago, Cook county, Illinois, have invented certain new and useful Improvements in Automatic Gas-Regulators, of which the following is a full, true, clear, and exact description, such as will enable others skilled in the art to which it appertains to make and use the same.

My invention relates to gas regulators, and has particular reference to improvements in automatic regulators for reducing the pressure between service gas pipes and the consumption pipes of the building in which the gas is used.

The invention further and particularly relates to improvements upon the gas regulator forming the subject-matter of my companion application, filed in the U. S. Patent Office July 14, 1910, and distinguished as Serial No. 572,048.

I apprehend that in the future illuminating and other gas will be distributed through mains under high pressure, and, as high pressure gas cannot be employed in the burners commonly found throughout the country, that it will be necessary to supply to each house or point of consumption a simple and yet efficient reducing valve or regulator by which the pressure in the consumption pipes may be kept down to a very few ounces.

The object of my invention is to provide such a regulator for such uses.

My invention consists generally in an automatic gas pressure reducing valve and regulator of the kind hereinafter described and particularly pointed out in the claims.

The invention will be more readily understood by reference to the accompanying drawings forming a part of this specification and in which;

Figure 1 is a vertical transverse section of a gas regulator embodying my invention; Fig. 2 is a sectional view thereof substantially on the line X—X of Fig. 1 viewed in the direction of the arrows; Fig. 3 is a similar section on the line Y—Y of Fig. 1; Fig. 4 is an enlarged detailed sectional view of the valve of my regulator; Fig. 5 is a sectional view of the valve on the line Z—Z of Fig. 4; and Fig. 6 is a detail view of a portion of the casing illustrating the method of adjusting the tension of the torsion spring.

As shown in the drawings, my novel gas regulator comprises a substantially-circular casing made in two parts 2 and 3, the part 2 forming the body of the casing and the part 3 being a cover secured thereto by a number of cap screws 4. Between the body 2 and the cover 3 is a diaphragm 5 reinforced at the center by metallic plates 6. The cover 3 contains a hole 3' so that atmospheric pressure is maintained upon the outer side of the diaphragm, *i. e.* the side toward the cover. In the upper part of the cover, upon the atmospheric side of the diaphragm, I arrange a cross shaft 6' carrying a torsion spring 7. The shaft is arranged in bearings 3'' in the cover and is adjustably secured against rotation by a set screw 8 in one of the bearings. One end 7' of the torsion spring is secured to the shaft 6' by being passed through a hole 6⁴ therein while the other end is formed into an arm 7'' terminating in a curl 7''' and pressing upon the center of the diaphragm. Thus formed the spring exerts its pressure to hold the diaphragm away from the inner wall of the cover in opposition to any gas pressure which may accumulate within the body 2—that is, within the chamber A back of the diaphragm. This spring is made adjustable as to its tension to adjust or vary the normal pressure of gas in the chamber A. This adjustment is effected by the rotation of the shaft 6' in its bearings, the shaft being squared or flattened at one of its projecting ends to receive a key 8', by which it may be rotated when the set screw 8 is loosened. The back of the body of the casing is provided with a wide vertical rib 2' containing an elongated vertical recess 2'' which opens into the circular portion of the chamber A. The top of the part 2 contains a threaded hole 9 to receive the exit or consumption pipe 10. The rib 2' extends below the wall of the casing 3 ending in a projection or neck 11 which is provided with a centrally threaded opening 12 opening into the interior of said casing and with a threaded opening 13 on its side to receive the inlet pipe 14, said opening 13 being connected with the opening 12 by the passage 15. The opening 12 receives the entrance valve or regulator valve proper through which the high pressure gas enters the chamber A. The largest part of the valve constitutes a threaded plug 16, having a square shoulder or head 17 at its lower end by means of which it may be forced or screwed into the threaded opening 12. The upper end of the plug is tapered slightly so that a very tight joint between the plug and the casing may be made by screwing the plug into place. The exact height to which the plug is adjusted in the casing is determined by the toggle lever mechanism which co-acts therewith as hereinafter explained. The upper part of the plug contains a vertical cylindrical chamber 18 reduced in effective diameter by the internal guide ribs 19, the inner edges of which are finished to serve as guides for the valve member 20. The bottom of the chamber 18 contains a central inlet hole 21 at the upper end of which is an annular seat 22 to receive the valve member 20. The plug 16 is provided with an annular recess or groove 23 disposed substantially opposite to or in line with the passage 15 and with a radial passage 24 which connects the central passage 21 with the annular groove 23 and through which the gas passes from the supply pipe 14 into the chamber A. The lower end of the central passage 21 is enlarged to form a drip chamber 25 which is closed at its lower end by means of a removable threaded plug 26. This chamber acts as a drip chamber to catch and retain any moisture which may enter the valve with the incoming gas. The lower end of the plug 16 is parallel or straight, instead of tapered and is threaded to receive the lock nut 27. The lower end of the projection 11 is dished and a soft packing ring 28 is provided adapted to be compressed against the dished end 28' of the projection 11 by the lock nut 27 to prevent the escape of gas at this point.

In the lower end of the valve 20 is a recess 20' which is utilized to hold a soft seat packing 20''. It will be observed that the annular wall 20''' surrounding the packing 20'' is relatively thin and in manufacturing the member 20 I preferably swage or compress this wall annularly upon the packing 20', thereby securing the latter firmly in place upon the lower end of the member 20. The upper end of the member 20 has a shoulder $20^4$ and the member 20 is supported by a conical spring 29, the upper end of which engages the shoulder $20^4$ while the spring rests upon the upper ends of the internal ribs 18 as best shown in Fig. 4. The spring is strong enough to support the valve member 20 out of contact with the seat 22 and such is its condition except under an abnormal pressure of gas within the chamber A at which time the valve is pressed down by the hereinafter described toggle lever mechanism which is actuated by the diaphragm. The upper end of the member 20 is provided with a recess $20^5$, similar to the recess 20''' in the lower end of the member, to receive a soft seat packing $20^6$ which in conjunction with the member 30 forms a safety valve adapted to close the passage into the casing A when the pressure upon the consumption side thereof is suddenly released as by the disruption or bursting of the diaphragm. The member 30 is an inverted cup containing the valve hole 30' which is provided at its lower end with an annular valve seat 30'' for the soft packing $20^6$. The member 30 is threaded into the upper end of the plug 16. A short stem or stud $20^7$ rises centrally from the top of the member 20 and extends considerably above the upper end of the member 30. This stem or stud is engaged by the diaphragm mechanism when the diaphragm is extended by pressure within the chamber A. The said mechanism comprises a toggle lever 31 composed of two links, a strut link 32 and a valve actuating link 33, the same being joined by pivot pins 34 and 35. The upper link or arm of the toggle lever is attached by a pin 36 to an internal lug 2''' at the top of the casing. The strut 32 is attached by a pin 32' to a lug 6' on the diaphragm, and the lower end of the link 33 is pivoted to the casing by a cross pin 33'. The several links are preferably U shaped in cross section and are wide enough to afford lateral stability to their pivots. The lower part 33'' of the link 33 is directly above the stud $20^7$ of the valve and when the diaphragm is extended by pressure within the chamber A the toggle lever is straightened to such an extent that the link 33 is moved down against the said stud of the valve and the valve is thereby forced down against its spring until the lower end of the member 20 is seated about the opening or passage 22, to close the latter. This relation of the parts is shown by dotted lines in Fig. 1. The full lines of Fig. 1 illustrate the position of the valve member 20 and the toggle mechanism at the moment when the pressure in the chamber A is *nil* or much less than normal. Normally the link 33 has a fixed pivot and a relatively fixed position within the casing. The valve plug is made adjustable in the manner hereinbefore explained, and, being adjustable, it may be raised or lowered in the thread of the opening 12 until the valve member 20 properly coacts with the toggle mechanism.

The operation of the regulator herein disclosed is as follows: When there is no pressure within the regulator the diaphragm and the toggle mechanism occupy the positions shown in Fig. 1 and the valve member 20 being at that time supported by the spring will stand midway between the two valve seats 22 and 30''. When gas is supplied to the pipe 14, it will flow through the passage 22, the chamber 18 and the opening 30', until the accumulating pressure in the chamber A is sufficient to distend the diaphragm so far as to straighten out the toggle lever and cause the lower end thereof to engage the stud of the valve member 20. The parts will remain in this condition until the distention of the diaphragm is increased to the point where the toggle mechanism forces the valve member firmly against the lower valve seat 22 and thus closes the entrance passage 21. The return of the diaphragm when pressure is reduced in chamber A suffers the valve to be lifted by its spring and to admit a further supply of gas. In event the diaphragm is broken or the consumption pipe is suddenly opened, the high pressure of the gas in the supply pipe 14, being no longer opposed by the diaphragm and toggle mechanism, will cause the valve suddenly to rise beyond the point of normal support by the spring 29 and close the opening or passage 30'. Once closed in this manner the valve will remain against the seat 30'' until the balance of pressures is restored. Obviously the valve 20 performs the function of a safety or automatic emergency valve, and a chief feature of my invention arises from the fact that the single member 20 performs the functions of both entrance and emergency valves, and its use enables the production of a regulator of remarkable simplicity, efficiency and reliability.

A particularly desirable feature of my improved gas regulator resides in the ease with which the regulating valve may be removed for repair without in any way disturbing the supply or consumption pipes, or the diaphragm and toggle lever mechanism.

My novel improvements in automatic gas regulators as herein disclosed, in so far as they relate broadly to the features of a floating inlet valve, carried by an adjustable valve plug which is removable from the casing independent of the controlling mechanism and of the discharge pipe leading from the casing, are not claimed herein; such forming the subject matter of my co-pending application hereinabove referred to and being therein described and claimed.

I claim:

1. A fluid pressure regulator comprising a chambered casing and valve operating mechanism therein responsive to fluid pressure, an inlet and an outlet port for said casing, pipe connections leading to and from said ports respectively, a valve associated with said inlet port and controlled by said mechanism for regulating the inflow of fluid to said casing, said valve being removable, intact, from and through said inlet port without disturbing said pipe connections and said mechanism.

2. A fluid pressure regulator comprising a chambered casing and valve operating mechanism therein responsive to fluid pressure, an inlet and an outlet port for said casing, pipe connections leading to and from said ports respectively, a valve member associated with said inlet port and controlled by said mechanism for regulating the inflow of fluid to said casing, said valve member being wholly removable from said casing through said inlet port without disturbing said pipe connections and said mechanism, and said valve being operable by fluid pressure to check the inflow of fluid upon the failure of said mechanism.

3. A fluid pressure regulator comprising a chambered casing and valve operating mechanism therein responsive to fluid pressure, an inlet and an outlet port for said casing, pipe connections leading to and from said ports respectively, a unit valve mechanism associated with said inlet port, comprising a valve casing and a floating valve member carried thereby, said valve member being controlled by said valve operating mechanism to regulate the flow of fluid through said port, said unit valve mechanism being removable from said port independently of said pipe connections and said valve operating mechanism.

4. A fluid pressure regulator comprising a chambered casing and valve operating mechanism therein responsive to fluid pressure, an inlet passage for said casing, a supply pipe communicating therewith, a valve in said passage controlled by said mechanism to regulate the inflow of fluid to said casing, said valve being removable intact from, and through, said passage without disturbing said mechanism or said supply pipe.

5. A fluid pressure regulator comprising a chambered casing and controlling mechanism therein responsive to fluid pressure, a fluid supply connection for said casing, a self contained valve member operable by said mechanism for regulating the supply of fluid to said casing, said valve member being detachable from said casing without disturbing said supply connection or the operating mechanism.

6. A fluid pressure regulator comprising a chambered casing and controlling mechanism within said casing responsive to fluid pressure, a neck on said casing, a supply pipe connected thereto, a valve plug inserted in said neck, a floating valve member carried by said plug and controlled by said mechanism for regulating the inflow of fluid to said casing, said valve plug and valve being removable from said casing independently of said supply pipe and said mechanism, and said valve member being operable independently of said mechanism to check the flow of fluid to said casing upon the failure of said mechanism due to an abnormal condition.

7. A fluid pressure regulator comprising a chambered casing provided with an inlet and an outlet passage, a supply pipe communicating with said inlet passage, a double seated valve in said inlet passage controlling the admission of fluid to said casing, means within said casing responsive to variations of pressure therein controlling the movement of said valve relative to one of its seats to regulate the flow of gas through said passage, said valve being adapted to automatically close upon its other seat by fluid pressure and independent of said mechanism to stop the flow of gas through said passage upon an abnormal decrease of pressure in said chamber, and said valve being completely removable from the outer end of said passage without disturbing the supply pipe.

8. In a gas regulator, a casing having a chamber provided with an inlet and an outlet passage, a supply pipe communicating with said inlet passage, a floating valve member operable within said inlet passage and controlling the flow of gas therethrough, a valve seat arranged at each end of said valve, a pressure operated diaphragm in said casing, a toggle lever mechanism within said chamber operable by said diaphragm and controlling the movement of said valve member relative to one of its seats to regulate the flow of gas through said passage, said valve being adapted to automatically close upon its other seat to stop the flow of gas through said passage upon an abnormal decrease of pressure within said casing and said valve being removable from said casing without disturbing said supply pipe.

9. A gas regulator comprising a casing, a gas pressure chamber within said casing having an inlet and an outlet passage, a supply pipe communicating with said inlet passage, a pressure responsive diaphragm within said casing, means for resisting the movement of said diaphragm in one direction, a valve operable in said inlet passage, a valve seat arranged at each end of said valve member, a valve controlling mechanism in said chamber operable by said diaphragm to control the movement of said valve relative to one of its seats to regulate the flow of gas through said inlet passage, said valve operating means being adapted to be moved out of the path of said valve member and permit it to be automatically closed upon its other seat upon an abnormal decrease of pressure within said chamber, and said valve member being removable from said casing without disturbing said supply pipe.

10. A fluid pressure regulator comprising a chambered casing, a neck on said casing, an inlet passage in said neck and means for supplying fluid to said passage, a unit valve structure in said passage comprising a valve plug and a valve member carried thereby said valve being operatively related to said mechanism and controlled thereby to regulate the inflow of fluid to said chamber, said unit valve structure being removable from said inlet passage without disturbing said fluid supply means.

11. A fluid pressure regulator comprising a chambered casing, a neck on said casing, an inlet passage in said neck and means for supplying fluid to said passage, a unit valve structure in said passage comprising a valve plug and a movable valve member carried thereby, said valve member being operatively related to said mechanism and controlled thereby to regulate the inflow of fluid to said chamber, said unit valve structure being adjustable in said neck to regulate the position of said valve relative to said mechanism and being removable from said casing independent of said gas supply.

12. A fluid pressure regulator comprising a chambered casing and controlling mechanism therein responsive to fluid pressure, a fluid supply connection for said casing, a self contained valve member operable by said mechanism for regulating the supply of fluid to said casing said valve member being detachable from said casing without disturbing said supply connection or the operating mechanism, and said valve member being adjustable relative to said controlling mechanism.

13. A gas pressure regulator comprising a chambered casing, an inlet and outlet port therefor, a controlling mechanism in said chamber responsive to fluid pressure, a valve plug associated with said inlet port, a valve carried by said plug and operable by said mechanism to regulate the inflow of gas to said casing and a drip chamber in said plug.

14. A gas pressure regulator comprising a chambered casing, an inlet and outlet port therefor, a controlling mechanism in said chamber responsive to fluid pressure, a valve plug associated with said inlet port, a valve carried by said plug and operable by said mechanism to regulate the inflow of gas to said casing, a drain passage through said plug and a removable plug closing said drain.

15. A gas pressure regulator comprising a chambered casing and pressure responsive mechanism therein and a combined inlet regulating valve and drip chamber removably associated with said casing, said valve being operable by said mechanism to regulate the inflow of gas to said casing, and said drip chamber being adapted to retain the moisture carried by the gas.

16. A fluid pressure regulator comprising a chambered casing and valve operating mechanism therein responsive to fluid pressure, said mechanism including a diaphragm and a torsion spring yieldingly maintaining said diaphragm responsive to the fluid pressure, an inlet and an outlet port for said casing, pipe connections leading to and from said ports respectively, a self-contained valve member associated with said inlet port and controlled by said mechanism for regulating the inflow of fluid to said casing, said valve member being removable intact from said inlet port without disturbing the pipe connections or the operating mechanism.

17. A fluid pressure regulator comprising a chambered casing and controlling mechanism therein responsive to fluid pressure, said mechanism including a diaphragm and an adjustable torsion spring counterbalancing the fluid pressure upon said diaphragm, a fluid supply connection for said casing, a self contained valve member operable by said mechanism for regulating the supply of fluid to said casing said valve member being detachable from said casing without disturbing said supply connection or the operating mechanism, and said valve member being adjustable relative to said controlling mechanism.

18. A fluid pressure regulator comprising a chambered casing provided with an outlet and an inlet port, a supply pipe communicating with said inlet port, a valve member operable within said inlet port and removable intact from said casing through said inlet port and without disturbing said supply pipe, a diaphragm in said casing, valve operating mechanism in said casing controlled by said diaphragm and associated with said valve for regulating the flow of fluid through said inlet port, and a torsion spring within said casing counterbalancing the fluid pressure upon said diaphragm, said spring being adjustable from the exterior of said casing.

19. A fluid pressure regulator comprising a chambered casing and a diaphragm therein responsive to variations of fluid pressures, a fluid supply connection for said casing, a self contained valve member for regulating the supply of fluid to said chamber, said valve member being detachable from said casing without disturbing said supply connection, valve operating mechanism associated with said diaphragm and said valve member for controlling said valve and a torsion spring within said casing yieldingly maintaining said diaphragm responsive to the fluid pressure within said casing said spring being adjustable from the exterior of said casing.

20. A fluid pressure regulator comprising a chambered casing having an inlet and an outlet passage, a supply pipe communicating with said inlet passage, a pressure responsive diaphragm within said casing, an adjustable torsion spring associated with said diaphragm for controlling the movement thereof in opposition to the fluid pressure, a double seated valve operable in said inlet passage, a valve controlling mechanism in said chamber operable by said diaphragm to control the movement of said valve relative to one of its seats to regulate the flow of fluid through said passage, said spring operating to carry said valve controlling mechanism out of the path of the valve, upon an abnormal decrease of pressure within said chamber, and allowing said valve to be closed upon its opposite seat to interrupt the flow of fluid to said casing, said valve being removable from said passage without disturbing said supply pipe.

21. A fluid pressure regulator comprising a chambered casing and valve operating mechanism therein responsive to fluid pressure, said mechanism including a diaphragm and a spring yieldingly maintaining said diaphragm responsive to fluid pressure, a fluid supply connection for said casing, a self-contained valve member operable by said mechanism for regulating the supply of fluid to said casing, said valve member being detachable as a whole from said casing without disturbing said supply connection or the operating mechanism.

22. A fluid pressure regulator comprising a chambered casing and valve operating mechanism therein responsive to fluid pressure, said mechanism including a diaphragm and a compression spring yieldingly maintaining said diaphragm responsive to the fluid pressure, an inlet and an outlet port for said casing, pipe connections leading to and from said ports respectively, a unitary valve mechanism associated with said inlet port, comprising a valve casing and a floating valve member carried thereby, said valve member being controlled by said valve operating mechanism to regulate the flow of fluid through said port, and said unitary valve mechanism being removable as a whole from said port independently of said pipe connections and said valve operating mechanism.

In testimony whereof, I have hereunto set my hand, this 29th day of June, 1910, in the presence of two subscribing witnesses.

WILLIAM A. BAEHR.

Witnesses:
ARTHUR W. NELSON,
JOHN R. LEFEVRE.